Nov. 19, 1963  L. D. LIPSCHUTZ  3,111,576
ACCOUNTING SYSTEM

Filed June 15, 1961  2 Sheets-Sheet 1

INVENTOR
LEWIS D. LIPSCHUTZ

AGENT

Nov. 19, 1963   L. D. LIPSCHUTZ   3,111,576
ACCOUNTING SYSTEM
Filed June 15, 1961   2 Sheets-Sheet 2
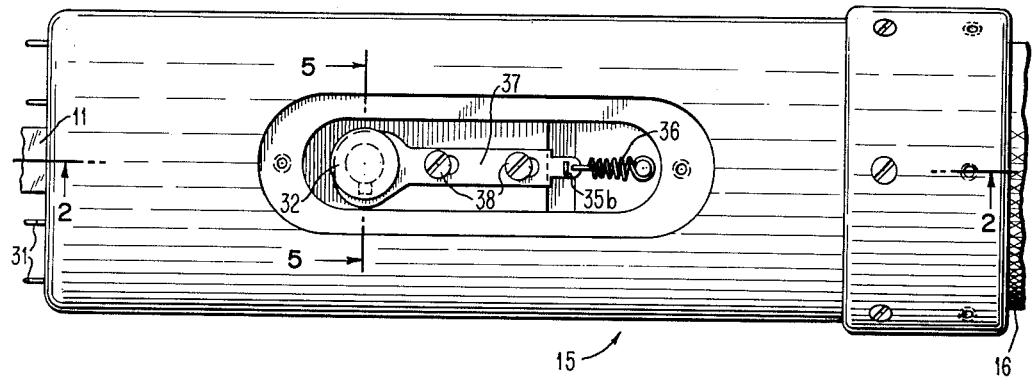
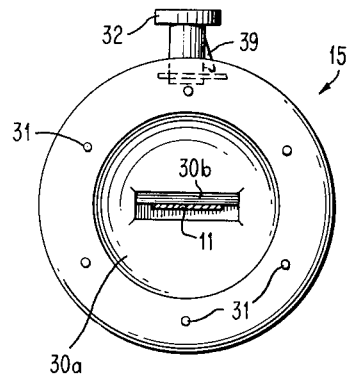
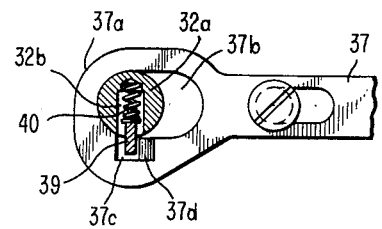
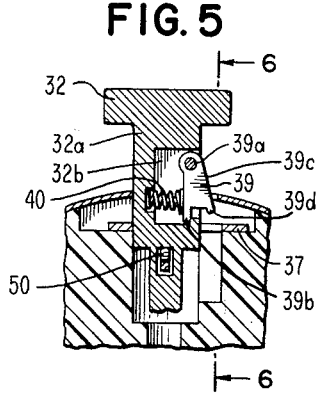
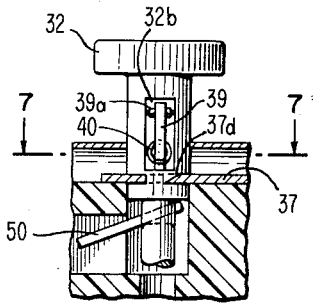

United States Patent Office 3,111,576
Patented Nov. 19, 1963

3,111,576
ACCOUNTING SYSTEM
Lewis D. Lipschutz, Poughkeepsie, N.Y., assignor to International Business Machines Corporation, New York, N.Y., a corporation of New York
Filed June 15, 1961, Ser. No. 117,425
6 Claims. (Cl. 235—61.11)

This invention relates to accounting systems, and more particularly to a method and apparatus for accounting for the sale of goods in a self-service store.

With the advent of the self-service store, and particularly the large food supermarkets, the problem of automating the delivery of goods to the customer and the tallying of the bill therefor has been a challenging one. Because of the tremendous variety of items in a large store (it may gross as large as 10,000 items), automatic handling of various size packages, including very fragile ones, requires a complex conveying mechanism. Preferably the customer should select and handle his own merchandise and account for it as he exits from the store. It is to the end of expediting and improving the accuracy of the accounting procedures at the checkout counter to obviate the long waits so frequently associated therewith, and to provide management with the necessary inventory and control records, that the instant invention is principally directed.

It is, therefore, an object of this invention to provide an improved system for accounting for the sale of goods in a self-service store.

A further object of this invention is to provide a method and apparatus for detecting the identity of separate items by sensing coded indicia contained on a flexible member affixed to the items.

Yet another object is to provide a device for sensing coded indicia contained on a flexible member affixed to an item of merchandise by attracting the member into coaction with the indicia sensing instrumentality through use of pressure differentials created by the rapid flow of a gaseous medium.

Still another object of this invention is to provide a system for identifying each item of merchandise selected for purchase by a customer in a self-service store and preparing an itemized account of said items for presentation to the customer as well as a record of sales for management use.

The foregoing and other objects, features and advantages of the invention will be apparent from the following more particular description of preferred embodiments of the invention, as illustrated in the accompanying drawings.

FIG. 3 is a top view of the sensing device.

FIG. 4 is an end view of the sensing device looking into the tag-receiving throat thereof.

FIGS. 5, 6 and 7 are details of the key latching mechanism with sectional views taken along the correspondingly numbered arrowed lines.

Operation of the System

The items of merchandise are arranged on shelves and racks for examination and selection by the customer much in the same manner as they have been displayed in conventional stores. To each package of goods is affixed by one end thereof a flexible tag having recorded indicia which identify the goods, as well as any other data required by any particular installation. The shelves or racks display a placard having the unit price of the goods arranged thereon or the prices can be printed on the items themselves. Meats, vegetables and other items requiring the assistance of an employee have flexible identifying tags affixed thereto by the employee when he prepares the merchandise to the order of the customer. Such special item tags might contain an indication of the weight and price of the item, as well as the identity and grade thereof. The tags are preferably adhesively affixed at one end to the separate items, and are so constructed that any attempt to remove the tag will either result in its destruction, or a readily detectable indication of its having been removed. This latter provision prevents fraud by preventing a dishonest customer from substituting the tag from an inexpensive item for that of an expensive item.

Figure 1:
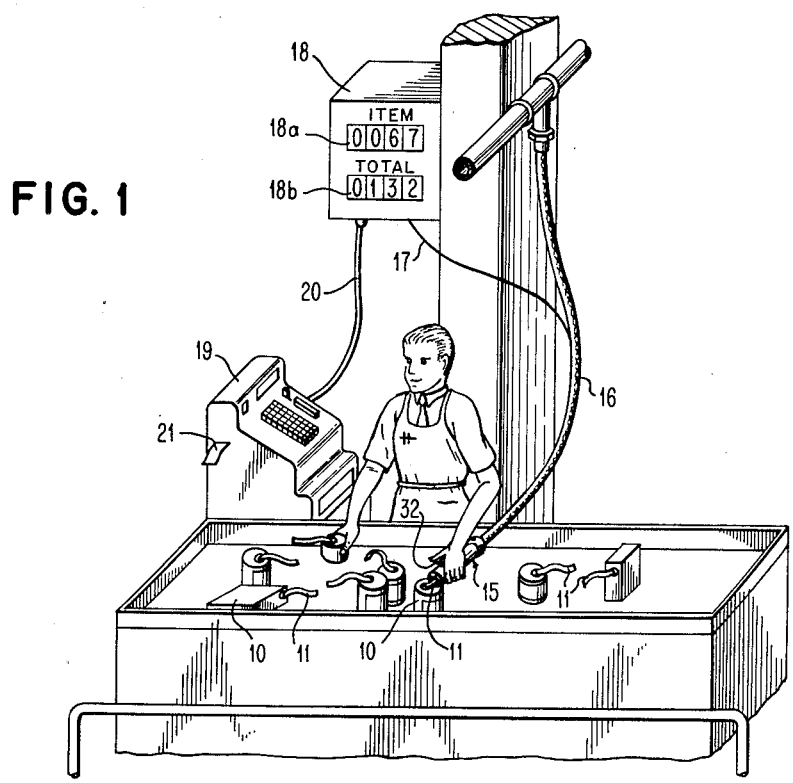
FIG. 1 is a pictorial representation of a checkout counter employing the instant invention.

Once the customer has assembled his purchases in the conventional shopping cart, he arranges them for checkout at the counter shown pictorially in FIG. 1. Each item 10 has affixed thereto a flexible indicia-bearing tag 11. The checker holds a wand 15 in his hand, which wand can be connected to a central vacuum pump by a suitable hose 16. By presenting the wand to each item the tag affixed thereto is sucked into the wand. Instrumentalities, to be described in detail, signal the operator that the tag has been drawn into the wand a sufficient distance to be sensed. Checking circuits detect that the coded indicia have been successfully sensed, and signal the operator if a failure to sense has been detected.

Electrical connections 17 from the sensing wand 15 enter signals produced by the codal marks read from the item tag 11 into a data processing unit 18, which displays to customer view the item price 18a and the cumulative total price 18b of the items registered. The data processing unit, in addition to displaying the prices, also prepares records for use by management in inventory control and sales analysis. If the item tags contain only an item stock number, a table lookup within the data processor equates the stock number to a unit price and item description, which will operate to control the display as well as an electrically operated cash register 19 through cable 20. The cash register operates in conventional fashion, with the keys electrically depressed by signals from the data processor 18. In addition to printing a tape 21 containing a listing of the price of the items purchased and the total price, the cash register prints an item identification opposite each price, so as to enable the customer to have a printed itemized tally of each item purchased. In the event that any tag fails to produce a valid reading, the checker may enter data manually into the cash register by means of a standard keyboard, which entry will also be entered into the data processor 18. Conventional control keys such as "total," "no sale," "credit" etc., would obviously be provided. The total key would perform its usual function of signalling the end of a transaction and would so signal the processor 18.

The Tag

Although the tag in the preferred embodiment is a flexible ribbon of magnetizable material having magnetically recorded indicia recorded thereon, it should be comprehended that any flexible ribbon-like or string-like tag upon which sensible markings are recorded can be equally well employed. The flexiblity of the tag and symmetry of the record thereon are the governing characteristics. Alternative forms might, for example, include a serially punched tape, a piece of string with abrasive areas arranged in a codal pattern, a piece of tape or string with colored bands, a member with areas having different dielectric constants or conductivity properties, to name but a few. If the tag contains only the stock number, it is not necessary that the indicia be erasable, for the stock number is not subject to change, as would the price for example.

The magnetic tag, which is preferred to be employed, is a thin ribbon of plastic material coated on one side with a magnetic oxide. The data is preferably recorded thereon serially-by-bit (parallel-by-bit recording can also be used), serially-by-character, by magnetizing a succession of discrete spots on the tape to manifest the binary bits constituting the codal representations of the data. The bi-polar mode of recording is preferably employed so as to provide a self-clocking action independent of tape speed. Because of the thinness of the plastic substrate, and the longitudinal spacing of the bits, the record thus prepared may be sensed with either the plastic backing or the magnetic oxide facing the transducer with no appreciable difference in the signal strength and resolution. This feature obviates any necessity of a particular orientation of the tape with respect to the sensing wand.

Because the tag for prepackaged goods need only contain a stock number, which identifies the packer, the size and type of container, and the contents and grade thereof, it can be prepared by the packer and affixed to the package. Alternatively the store management can prepare and affix the tapes with its own stock number code and any other desired data. To this end, a simple tool with inserted slugs of permanently magnetized material arranged in the required codal pattern will, when applied to the tape magnetize spots in accordance with the arrangement of the slugs. Alternatively, if the volume of operations is sufficiently great, a punched card controlled tape magnetizing device employing electromagnets energized under control of the holes in the card could be advantageously employed. Such a device would operate on a reel of magnetic tape and produce tags in any quantity. Equally well such a device could price, and automatically affix the tags to the items of merchandise.

Regardless of the apparatus used for preparing the tags, the code employed should preferably be a self-checking one to insure that the data has been correctly sensed at the checkout station. A two-out-five code, the so-called "Hamming" code, or any of the well-known code expedients employed for this purpose will suffice. Once an item is marked, it need never be changed, provided that it does not contain price information. Shelf or rack signs adjacent to the merchandise are a sufficient notice of the price, particularly since the customer receives an itemized sales slip as a work product of the system.

Special items such as meats, vegetables, etc., which are prepared to the customer order will in all instances have affixed thereto a tag containing all the pertinent information such as, type of meat, cut, grade, weight, price, packer, carcass number, etc. This tag is automatically prepared by the butcher through use of a recording device into which a punched card identifying the packer, carcass number, grade etc., is inserted, and into which the butcher keys in the cut and price per pound, the weight and total price being supplied by an automatic computing scale. Although all of this data is not necessarily made available to the customer, it is useful to the store management in moving its stock in accordance with the age thereof, and in adjusting any customer dissatisfactions.

All tags should preferably include some anti-fraud provision. The self-checking code is one such provision. A further feature is the use of a pressure sensitive adhesive that discolors the tag if it is removed at any time after its initial affixation. The checker can therefore readily detect any tag substitution. For example, if the tag were a uniform brown in color it would be quite obvious that a fraud were being attempted if the adhesive end of the tag were to turn a bright yellow upon any attempt to remove it. Alternatively, if the adhesive end were initially colored yellow, and the adhesive were such that destruction of the tag would result from forceful removal, any tag without a yellow end adhered to the item would be a fraudulent one.

The Scanner

With the tags affixed to the items of merchandise, several methods of sensing may be logically adopted. The tags may be sucked into the sensing wand and then withdrawn, with sensing occurring during the withdrawal stroke. Alternatively, the tags may be sucked into the sensing wand, cut off, and sucked further into the wand while sensing occurs, or the severed tag may be conveyed to the data processor for sensing there. In the latter mode of operation, if sensing fails, the checker is deprived of a second try, as the tag is sucked up into the vacuum system. In any of these systems, it is contemplated that tags will become crumpled and perhaps even torn. Because of the strong flow of air, and the fact that the tag is adhered to the merchandise, it will have a strong tendency to be held straight in the throat of the sensing wand. The coarse coding employed will further bridge minor discontinuities in the tags. Finally, the self-checking code will prevent or signal any misregistrations, and permit manual keying of a sales record of those items failing to register properly.

The wand 15 is connected to a strong central vacuum system so as to provide a continuous strong flow of air into and through the air channel 30 of the wand. This throat includes a funnel-shaped entrance throat 30a, a restricted channel 30b, and terminates in an exit port 30c. These air passages are aerodynamically shaped so as to attract the tag 11 into the throat 30a and stream it in a straight path in the channel 30b, until the tag covers the exit port 30c with substantially no flutter. As is shown in FIG. 4, the channel 30b is rectangular in cross-section so as to orient the tag with the flat sides thereof parallel to the greater sides of the rectangle. Pins 31 surrounding the throat prevent the adherence of the wand to the items of merchandise, and also prevent sealing off the air flow through the wand.

It is necessary to signal the checker that the tag has entered the sensing wand a distance sufficient to permit sensing. To this end, a button 32 is provided upon which the operator applies pressure upon presenting the wand to each separate item of merchandise. This button is normally latched against depression. When, however, the tag 11 covers the exit port 30c, the key 32 will be unlatched (by devices to be described), and the sudden yielding of the key will provide a tactual signal to the operator that the tape is in a position to be sensed. If sensing is to occur upon withdrawal of the tape, this signal will cause the operator to pull the wand away, partly by reflex action. If the tag is to be severed and sensed, the depression of the key itself will sever the tape. In both modes of operation depression of the key 32 will move a pressure shoe in the form of a resiliently mounted roller 43 into contact with the tape 11, and the tape in turn will be urged into intimate contact with a magnetic transducer 33 of the conventional air gap construction, whereby relative movement of the tape with its magnetic spots over the air gap will induce current in the coil 33a manifestive of the recorded code, in well-known fashion, which current is conducted through cable 17 to the data processor 13. Upon completion of sensing in either mode the operator releases the key 32 which latches in readiness for the next sensing operation.

Figure 2:
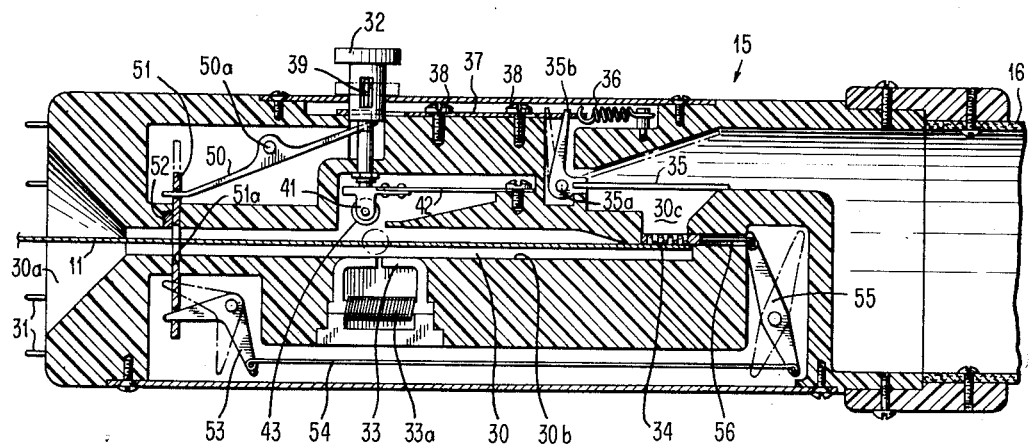
FIG. 2 is a sectional view of the merchandise tag sensing device taken along the line 2—2 of FIG. 3.

The detailed structural drawing of FIG. 2 includes instrumentalities for both sensing modes, and some of the structure is common to both. The action begins, when the tag 11 is sucked far enough into the channel 30b so as to cover the exit port 30c. This port is provided with a screen 34 which blocks the tag from further movement and effectively prevents further air flow when the screen is covered by the tag. A vane 35, pivoted at 35a, is normally urged in a clockwise direction by tension spring 36. The air flow through the exit port 30c, however, produces a force superior to the spring tension to rock the vane 35 into the position shown dotted in FIG. 2. When the air flow is blocked by the sealing of screen 34 by the end of tag 11, the spring 36 becomes active to rock the vane 35 to the position shown in full line in FIG. 2. The vane 35 has an upstanding tab 35b which projects through a slot in a slide 37, to which slide the spring 36 is hooked. The slide 37 is guided by screws 38 which coact with slotted holes. The slide 37 operates as the latch for the key 32, and prevents its depression when the vane 35 is acted upon by the air flow to occupy the dotted position. As is better shown in FIGS. 5 and 7, the slide 37 has an enlarged left end 37a with an elongated opening 37b surrounding the key shank 32a. A keyhole slot 37c opens into the opening 37b to provide clearance for a spring loaded latch 39 pivoted at 39a to key 32. Inasmuch as the slide 37 must be moved by the spring 36 while the key 32 is under finger pressure by the operator, an inclined surface 37d is provided so that the key pressure acting through latch 29 will not bind the latch slide 37 against movement. The angle of inclination of the surface 37d is such that the reactive force of the downward key pressure will not in and of itself move the slide 37 to the right, but will assist its movement when the air pressure on the vane 35 is removed. The latch 39 is received in a pocket 32b in the key stem 32a, urged outward by spring 40, but restrained from undue movement by the tab 39b (FIG. 5). Because the latch slide 37 normally occupies a latching position, provision must be made to allow the restoration of key 32 upon removal of pressure thereon, even though the slide 37 is latched. To this end, when the key 32 is depressed, the latch 39 lies beneath the slide 37 such that the pivot 39a is about on the same level as the slide. The upward movement of key 32 will therefore cause the sloping surface 39c of the latch to coact with the side of the opening 37b, thus rocking the latch 29 clockwise (FIG. 3) to permit the unrestricted upward movement of key 32. When the key is fully restored, the latch 39 will rock over the slide 37 to prevent depression thereof by coaction of the tab 39d with the slide.

The lower end of key 32 abuts a saddle 41 riveted to a leaf spring 42, the saddle rotatably mounting the roller 43. The spring 42 provides the bias to return the key 32.

The parts described above function to sense a tag upon the withdrawal of the tag from the sensing wand. The parts now to be described, when added to the previously described parts provides for severing the tape and sensing it while it is being sucked into the vacuum system.

A rock lever 50 pivoted at 50a, fits within a slot in the key stem 32 so that it is rocked clockwise upon depression of the key. The other end of lever 50 fits within a slot in a shear slide 51 having an opening through which the tag 11 is threaded by the air flow. Upward movement of the shear slide 51 engages the tag between the cutting edge 51a and a stationary cutting edge 52 to shear the tape. Movement of slide 51 through coaction with bell crank 53, pull rod 54, lever 55, and link 56 withdraws screen 34 from the exit duct 30c to permit the now severed tape to be sucked up and away into the exhaust system. Because of the mass of roller 43, the acceleration of the tape will be limited to a reasonable value, or the roller can be driven at a uniform velocity.

In the withdrawal system of tag scanning, the data would be recorded in that segment of tape lying to the right of the transducer gap in FIG. 2. In the sever and sense system the data would be recorded between the shear 51 and the transducer, and would be recorded serially-by-bit in the converse order with respect to the data of the withdrawal system.

Although an air operated device has been described, it should be apparent that other expedients for performing some of the required operations could equally well be employed. For example, a photo cell placed at the end of the duct 30 at a position corresponding to that occupied by the screen 34 could sense the presence of the end of the tag and through electromagnetic means move the roller 43 into coaction with the tape. So too, could the severing mechanism be operated magnetically.

Whichever system of sensing is employed, a train of impulses manifestive of the digital data recorded on the tag will be transmitted to the data processing unit 18. Although such unit would not approach the complexity of a modern electronic data processing machine system, it would perform many of the functions of such a system. For this reason, the data processor 18 will not be described in detail. If one likens the sensing wand 15 to the magnetic tape unit of a data processing system and the cash register 19 to the console unit including a printer, he will readily appreciate that the functions of the data processor 18 are standard functions of known computer art. The so-called table lookup, previously referred to, consists of an addressable memory, wherein the stock number provides the control to address the memory, at which address the item price, as well as any other information necessary to control the printing of the sales slip and the tallying of the totals are stored. Because of the tremendous speed of electronic apparatus, the table lookup and other functions can be performed by a single data processor, time-shared by all the checkout stations. This single unit also serves to prepare the management records, as for example, a magnetic tape record of all items sold for inventory records. From this sort of data, store management has a record of all sales, by customer, and by the time of day so as to permit accurate studies of buying habits for more efficient and profitable merchandising.

Although the apparatus has been particularly described with respect to the operation of a self-service store, it will be readily apparent that a portable unit with its own air blower could equally well be employed in a warehouse for taking inventory and reporting to a central data processing installation, or adjacent to a conveyor belt for sorting and routing items carried thereby. Other uses for the flexible data record which is sucked or blown into coaction with a data sensing device capable of converting the recorded coded data into electrical signals for use in data processing systems or other controlled devices will occur to those skilled in the art.

While the invention has been particularly shown and described with reference to preferred embodiments thereof, it will be understood by those skilled in the art that various changes in form and details may be made therein without departing from the spirit and scope of the invention.

What is claimed is:

1. Apparatus for detecting data with respect to an item of merchandise having loosely affixed thereto a tag bearing coded indicia manifestive of the data pertinent to the item, comprising a transducer for converting the coded indicia into signals manifestive of the data recorded on said tag, and pneumatically actuated means for producing a force acting upon said tag to cause it alone to move into coaction with said transducer while said tag is still affixed to the item of merchandise.

2. Apparatus for detecting data with respect to an item of merchandise having affixed thereto a tag bearing coded indicia manifestive of the data pertinent to the item, comprising a wand including a throat and connecting channel, means for producing a forceful air flow into said throat and through said channel whereby said tag will be drawn by said air flow into said channel when the wand occupies a position proximate to said tag, and a transducer adjacent to said channel and operative to sense the said coded indicia and produce signals manifestive of the data content of said tag.

3. Apparatus for detecting data with respect to an item of merchandise having affixed thereto a tag bearing indicia manifestive of the data pertinent to the item, comprising a wand including a throat and connecting channel, means for producing a forceful flow of air into said throat and through said channel whereby said tag will be drawn by said air flow into said channel when the wand occupies a position proximate to said tag, a transducer adjacent to said channel and operative to sense the said coded indicia and produce signals manifestive of the coded data content of said tag, and means for severing the said tag from the item of merchandise.

4. A device for sensing the coded indicia recorded on a long flexible record member affixed at one end thereof to an item of merchandise to which the coded indicia are pertinent, comprising a housing, a throat opening to the exterior of said housing and connecting with a duct internal to said housing, means for inducing a forceful flow of air into said throat and through said duct, a transducer disposed in the wall of said duct and operative responsive to said recorded coded indicia to produce manifestations of the data represented by said indicia, and means responsive to the insertion of said record member a predetermined distance within said duct to move the said record member into sensing coaction with said transducer.

5. A device for sensing indicia magnetically recorded on an elongated flexible magnetic member affixed by one end thereof to an item of merchandise comprising, a duct, means for providing a forced flow of air into said duct so as to attract and stream the said member within said duct, a magnetic transducer disposed within the walls of said duct, and means for pressing the said member into coaction with said transducer whereby the relative motion induced by withdrawal of the said member from the said duct will cause said transducer to produce signals manifestive of the indicia magnetically recorded on said member.

6. A device for sensing indicia magnetically recorded on an elongated member affixed by one end thereof to an item of merchandise comprising, a duct, means for providing a forced flow of air into said duct so as to attract and stream the said member within said duct, means for detecting the presence of a predetermined length of the member within the duct, a transducer disposed within the walls of said duct, means responsive to said detecting means for pressing said member into coactive relationship with said transducer so that upon withdrawal of the member from said duct the transducer will produce signals manifestive of the recorded indicia.

References Cited in the file of this patent
UNITED STATES PATENTS

| | | |
|---|---|---|
| 2,746,679 | Stratton | May 22, 1956 |
| 2,943,814 | Mittag | July 5, 1960 |
| 2,980,319 | Clemens | Apr. 18, 1961 |